No. 649,704. Patented May 15, 1900.
J. McGLOUGHLIN & A. LESPERANCE.
CLUTCH.
(Application filed Apr. 17, 1897.)
(No Model.)
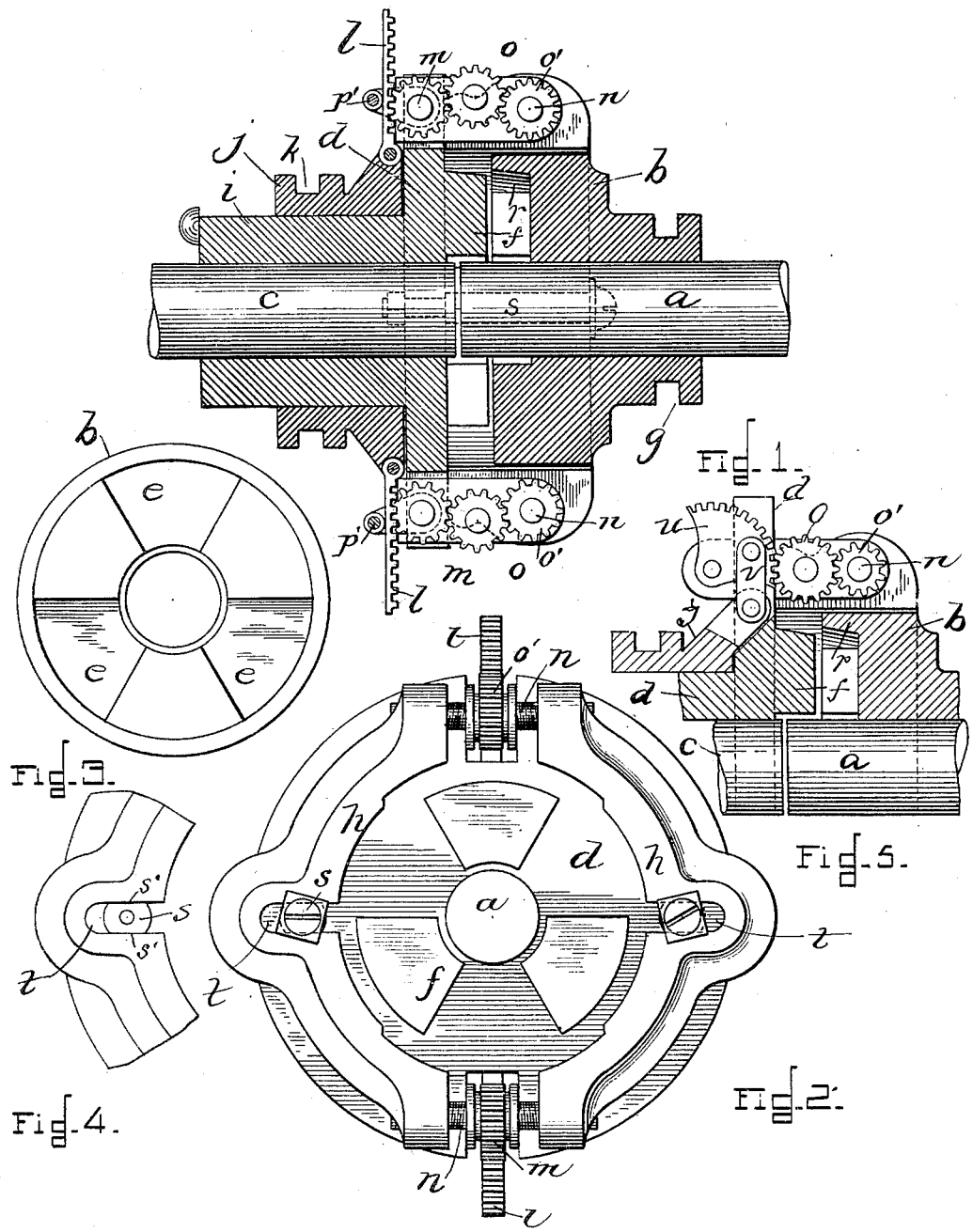

UNITED STATES PATENT OFFICE.

JAMES McGLOUGHLIN AND ALEXANDER LESPERANCE, OF LACONIA, NEW HAMPSHIRE; SAID LESPERANCE ASSIGNOR TO SAID McGLOUGHLIN.

CLUTCH.

SPECIFICATION forming part of Letters Patent No. 649,704, dated May 15, 1900.

Application filed April 17, 1897. Serial No. 632,619. (No model.)

*To all whom it may concern:*

Be it known that we, JAMES McGLOUGHLIN and ALEXANDER LESPERANCE, of Laconia, in the county of Belknap and State of New Hampshire, have invented certain new and useful Improvements in Clutch Mechanisms, of which the following is a description sufficiently full, clear, and exact to enable those skilled in the art to which it appertains or with which it is most nearly connected to make and use the same.

This invention relates to that class of devices in the operation of machinery commonly known as "friction-clutches," by which one shaft is connected with another or by which a divided shaft may be connected and driven or by which a driven shaft may be caused to impart its motion to another shaft or thing, as occasion may require.
Several things are requisite to a perfectly-operating contrivance of the character mentioned, among which are that it shall "take hold" readily and easily, "let go" on the instant of its being unshipped, and hold firmly when in clutch position.

In some classes of machines it is quite essential that there should be no slippage whatsoever of the clutch parts after the machines shall have been started. This is the case, for example, when a dynamo-machine is driven on opposite sides of the driving-pulley.

It is the object of the invention to provide a clutch of improved organization which may be first frictionally connected to start the machine or machines, and then positively connected so that there may be no possible slippage, and so that two machines on opposite sides of the driving-pulley may be driven in absolute unison.
To these ends our invention comprises in its construction a friction-ring, as hereinafter set forth, which may be first operated to frictionally connect the two main members, so as to set one in motion from the other, then after getting the two members fully in motion unshipping the friction-ring and bringing the two main members together to positively connect them, the faces of the main members being constructed and arranged to effect such positive connection or joinder, all as we will now proceed to describe in detail and subsequently point out in the claims.

Reference is to be had to the annexed drawings, and to the letters of reference marked thereon, forming a part of this specification, the same letters indicating the same parts or features, as the case may be, wherever they occur.

Of the drawings, Figure 1 is a sectional view showing our invention complete and applied to the ends of two shafts. Fig. 2 is an end view of what for the purpose of this specification we shall call the "driven" member of the clutch mechanism, showing also the friction clamping-ring suitably connected therewith and certain equipments of the ring. Fig. 3 is an end view of what we have chosen to call the "driving" member. Fig. 4 is a detail view showing the connection of the bolts with the ring. Fig. 5 is a modified view of a part.

In the drawings, $a$ designates the running or driving shaft, with the end of which the driving member $b$ of one of the principal parts of the clutch is suitably connected.

$c$ is the driven shaft, with which the other principal clutch part $d$ is suitably connected.

The face of one of the clutch members $b$ (herein shown) is provided on its face with recesses $e$, with which projections or bosses $f$ on the opposite face of the other member $d$ are adapted to engage when the two members are brought together, as it is intended they may be in the operation of the device.

The member $b$ is applied to the shaft $a$ in any known way, so as to turn therewith, but at the same time be moved longitudinally thereon by the engagement of a suitable shipping device with the groove $g$, formed in the hub of the said member, or by other suitable means, all as is well known to mechanics of ordinary skill.

$h$ is a clamping-ring formed, as herein shown, as of halves or segments. The said clamping-ring is suitably connected with the clutch member $d$ and surrounds the periphery of the member $b$ and is adapted to be clamped thereon by drawing the halves or parts of the ring $h$ together.

On the hub $i$ of the member $d$ is applied a sliding hub $j$ in a manner similar to that in which the member $b$ is applied to the shaft $a$, which hub $j$ by the engagement of a fork or other suitable means with the groove $k$ permits of the said hub $j$ being moved longitudinally on the hub $i$ while turning in unison with it. Pivoted upon the hub $j$ are toothed levers or racks $l$, which are held in engagement with pinions $m$ by a pin, or it may be an antifriction-roller $h'$, supported by a bracket on the opposing hub, behind which the lever $l$ extends, so that when the rack-bars $l$ are actuated the right and left screws $n$, tapped into the ends of the segments or parts of the clamping-ring $h$, are likewise operated by means of the pinions $o'$ thereon through the medium of the intermediate pinion $o$, as will be readily understood from an inspection of the drawings. All of the pinions may be supported by a kind of bracket extending from the hub $d$, or they may be otherwise suitably supported or held in place, employing therefor any means within the discretion of a mechanic. By moving the hub $j$ inward the screws $n$ will be operated so as to draw the parts of the clamping-ring together and secure a frictional connection of the members $b\ d$, and by moving the said hub outward the parts of the clamping-ring will be separated and the frictional connection of the parts $b\ d$ will be released.

The general operation of the device may now be described. When the clutch is released or unshipped and it is desired to connect it, the hub $j$ is shipped inward, the screws $n$ are actuated, so as to move the ring $h$ into clamped position, frictionally connect the two members $b\ d$, and gradually start the driven member from the driving member. After the two members have gotten into running order, substantially in unison, the hub $j$ will be moved outward to release the clamping-ring from the member $b$, and the latter will be immediately shipped inward to become positively engaged with the member $d$, as before described. The clutch may be unshipped at any time desired by simply moving the member $b$ outward. The flange or ring $r$, formed on the outer edge of the member $b$ and overlapping the peripheries of the bosses $f$, operates to center the parts and keep the same and the sections of the shaft in perfect alinement. The bolts $s$, connected with the member $d$ and extending through slots $t$ in the ring, are flattened at the points where they project through the said slots, so that when the ring is tightened on the periphery of the member $b$ the bolts will be clamped securely in the said slots and all backlash prevented. This is an important feature of the invention. (See Fig. 4.)

Instead of employing the rack $l$ and pinion $m$ we may use a pivoted segment of a gear $u$, connected by means of a link $v$ with the collar $j$, which segment may engage the intermediate pinion $o$, which in turn engages the pinion which operates the right and left screws $n$, as seen in Fig. 6. The construction leaves no projecting part beyond the periphery of the part or member $d$.

By the means described the clutch may first be frictionally connected and subsequently connected positively, the parts can be started gradually, and by having the frictional device operate as far from the axis of rotation as possible it is rendered feasible to reduce the size of the device to the minimum. Furthermore, the operation is easy, and the parts and shafts are kept in perfect alinement.

We do not confine ourselves to the precise means herein described, having merely represented and explained the invention in one of the best forms now known to us.

Having thus explained the nature of the invention and described a way of constructing and using the same, though without attempting to set forth all of the forms in which it may be made or all of the modes of its use, it is declared that what is claimed is—

1. A clutch device embodying in its construction a shaft and a clutch member thereon; a second shaft and a second clutch member thereon, the second clutch member having a hub; a second hub longitudinally movable on the first hub; a clamping-ring consisting of a plurality of segments connected with the second clutch member and extending over and adapted to engage the periphery of the first clutch member; and means connecting said longitudinally-movable hub with the rings to separate the parts of the ring or to draw them together into clamping engagement with the second clutch member, said clutch members having their opposing faces constructed, substantially as described, to enable one to positively engage the other when the two are brought together.

2. A clutch device embodying in its construction a shaft and a clutch member $b$ longitudinally movable thereon, the shaft $c$ and the clutch member $d$ having the hub $i$, the hub $j$, longitudinally movable on the hub $i$, the two clutch members having their opposing faces constructed, substantially as described, to enable one to positively engage the other when the two are brought together, the clamping-ring composed of two segments or halves connected with the clutch member $d$ and extending over the periphery of the member $b$, right and left screws $n$ tapped into the ends of the said segments, pinions engaging the said screws, and a rack on the hub $j$ to engage and operate the said pinions.

3. In a clutch mechanism, the members $b\ d$, for effecting the positive clutching of the parts, combined with a frictional clutch-ring composed of a plurality of parts or segments carried by the member $b$, right and left hand screws $n$ for engaging and closing the ring-segments upon the member $d$ to frictionally connect said members $b$ and $d$, and means, substantially as described, between the right and left hand screws to turn the same, whereby the segments with which said screws are connected can be moved toward or from each other to frictionally clutch the members *b* and *d* or to release the same.

4. A clutch mechanism comprising in its construction the members *b d* for effecting the positive clutching of the parts, a ring composed of segments adapted at their ends to be drawn together and clamped upon the peripheries of the members for frictionally connecting the members, the said segments being provided with slots *t*, bolts *s*, flattened on their sides, as at *s'*, connected with one of the said members and passing through the said slots, and nuts turned on the said bolts.

5. A clutch device embodying a shaft having a positive clutch member thereon, a second shaft having a confronting clutch member provided with means for positive engagement with said first member and provided with a hub, means for moving one of the members into engagement with the other, a hub longitudinally movable on the first-mentioned hub, a clamping-ring formed of a plurality of segments connected to the last-mentioned clutch member and extending over the periphery of the first-mentioned clutch member, and means connecting the last-mentioned hub with the clamping-ring to move the segments toward or from each other.

6. A combined friction and positive clutch embodying two positive clutch members, means to move one into positive engagement with the other, a ring carried by one of said positive clutch members and consisting of a plurality of segments overreaching the periphery of the other of said positive clutch members, and means independent of the positive clutch means to move said segments into or out of frictional engagement with the periphery of the positive clutch member overreached thereby, whereby said friction and positive clutch devices may be operated singly or jointly as occasion requires.

7. A combined friction and positive clutch, comprising two positive clutch members; means for positively connecting one of said members with the other; an expansible friction-ring, carried by one of said positive clutch members and overreaching the periphery of the other of said positive clutch members; and means, independent of said positive clutching means, to contract said ring into frictional engagement with the periphery of the positive clutch member overreached thereby; whereby said friction and positive clutch devices may be operated singly or jointly as occasion requires.

In testimony whereof we have signed our names to this specification, in the presence of two subscribing witnesses, this 12th day of February, A. D. 1897.

JAMES McGLOUGHLIN.
  ALEXANDER LESPERANCE.

Witnesses:
  ARTHUR W. CROSSLEY,
  ALPHONSO M. LUNE.